Nov. 16, 1937.    R. HELLBACH    2,098,962
METHOD FOR CARRYING OUT AERATION IN BIOCHEMICAL PROCESSES
Filed May 7, 1935    2 Sheets-Sheet 1

Nov. 16, 1937.   R. HELLBACH   2,098,962
METHOD FOR CARRYING OUT AERATION IN BIOCHEMICAL PROCESSES
Filed May 7, 1935   2 Sheets-Sheet 2

Inventor
R. Hellbach

Patented Nov. 16, 1937

2,098,962

UNITED STATES PATENT OFFICE 2,098,962

METHOD FOR CARRYING OUT AERATION IN BIOCHEMICAL PROCESSES

Rudolph Hellbach, Washington, D. C., assignor to Henry A. Wallace, for the Government of the United States Application May 7, 1935, Serial No. 20,195

2 Claims. (Cl. 195—109)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

My invention relates to a method for carrying out biochemical processes, more especially processes of fermentation.

There are several biochemical processes which are at present used for technical purposes, as, for instance, the fermentation of carbohydrates by means of fungi and bacteria to produce gluconic acid, citric acid, kojic acid, lactic acid, dihydroxyacetone, acetyl-methyl carbinol, sorbose, etc. It has been found that certain of these processes, notably those for the production of gluconic acid and kojic acid, are greatly facilitated by being carried on under pressures greater than atmospheric of gases containing appreciable quantities of oxygen, so that the liquid is saturated with these gases. A number of means may be used for this purpose, especially those by which the gas is introduced to the container under pressure through some type of nozzle provided with a means for finally dividing the stream of gas before its injection into the solution. This object may also be attained by means of high speed agitation producing large quantities of foam, so that the fermentation is carried on in the foam as taught by United States Patent No. 1,893,819.

However, there are a number of mechanical difficulties which have been encountered in the utilization of methods of aeration set forth in the preceding paragraph. For instance, when nozzles utilizing porous plates of various types are used, considerable trouble is encountered, owing to the plugging of these plates during the growth of the micro-organisms involved, thus limiting the usefulness of this means of aeration. Where high speed agitation is used to accomplish this result, certain undesirable factors are encountered, such as excessive power consumption, and difficulties in mechanical operation.

My invention is directed to an efficient means for obtaining aeration in biochemical processes.

The annexed drawings and the following description, set forth in detail one mode of carrying out my invention, such, however, illustrating but one of various ways in which the principle of the invention may be used.

Similar characters of reference refer to similar parts throughout the several views.

Figure 1:
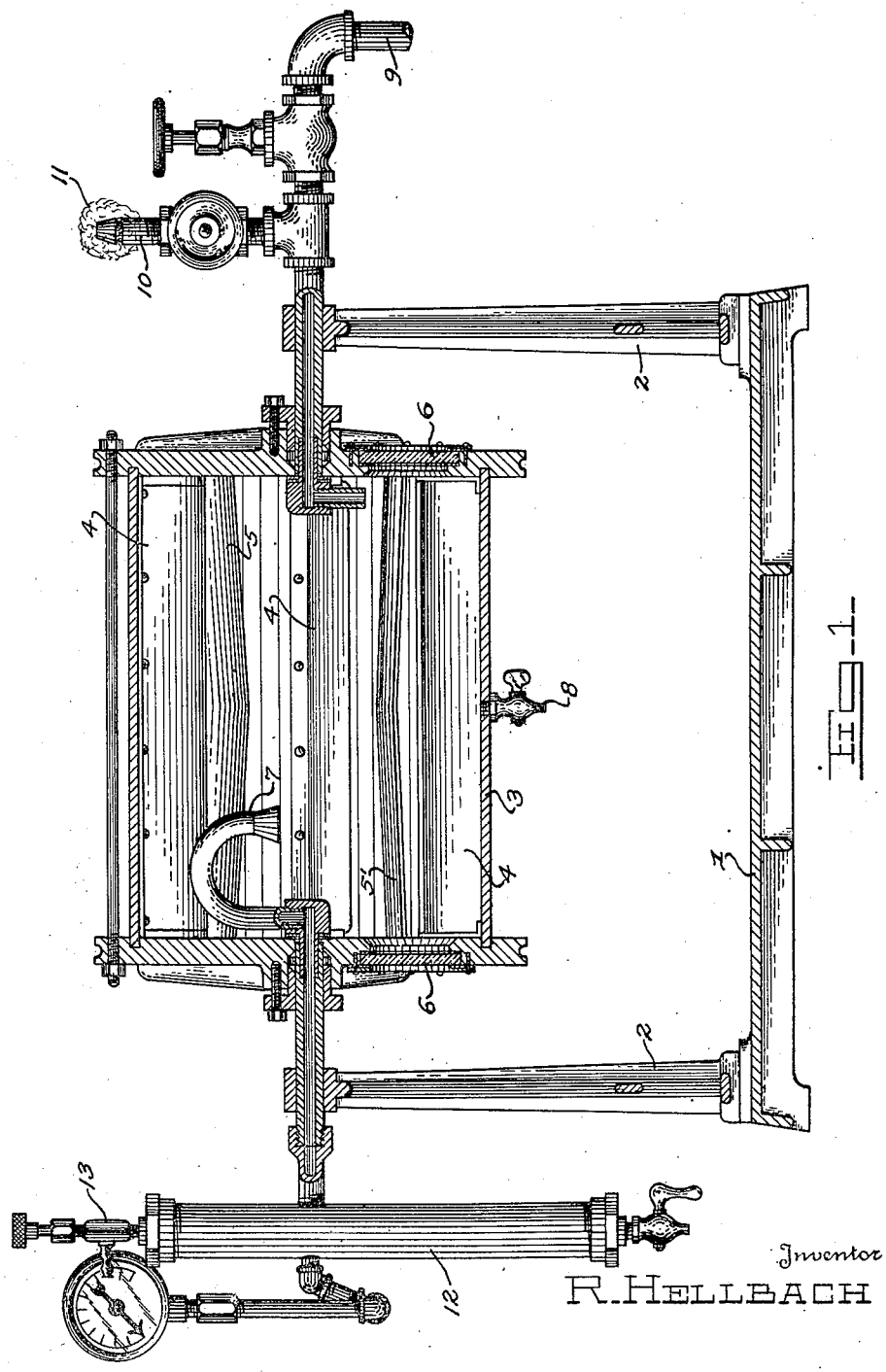
Fig. 1 is a longitudinal-sectional view with parts in elevation of the completely assembled apparatus.
Figure 2:
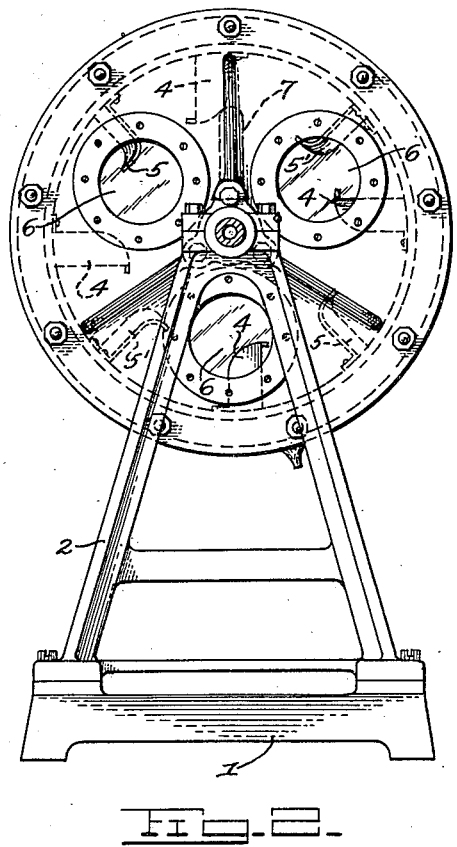
Fig. 2 is a cross-sectional view, taken between parts 2 and 12, of the apparatus illustrated in Fig. 1.
Figures 3, 4:
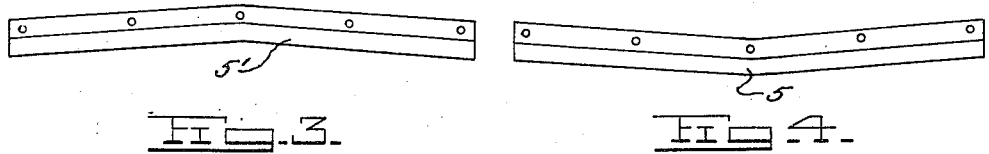
Fig. 3 is a top plan view of a baffle bent upward illustrated in Fig. 1.
Fig. 4 is a top plan view of a baffle bent downward illustrated in Fig. 1.
Figure 5:
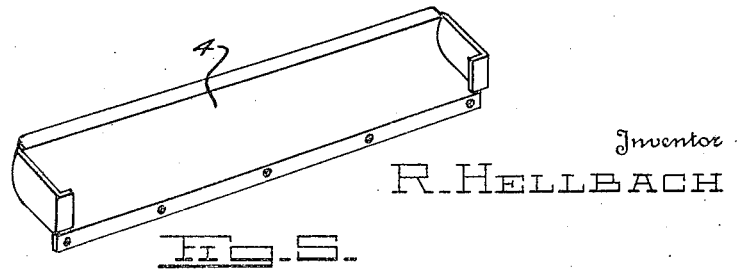
Fig. 5 is a perspective view of one of the buckets illustrated in Fig. 1.

Referring now to the drawings, and more specifically to Fig. 1, the operation of the apparatus is carried out as follows: After complete sterilization of the apparatus by steam under pressure, introduced through the air inlet 9, the inoculated fermentable material in solution is introduced into the drum 3 through the enlarged inlet 10, which is protected by cotton 11. The drum 3, which is supported on base 1 and trunnion 2, is then rotated, and a gas containing an appreciable quantity of oxygen, and which has been filtered through sterile cotton, is introduced under pressure through the air inlet 9. When the air reaches the desired pressure, it is allowed to flow at a measured rate through the air outlet 7, into the liquid trap 12. The air flow is controlled by the needle valve 13. When the drum 3 is rotated the fermentable material is lifted in the buckets 4, which causes it to fall in substantially thin sheets as the bucket 4 approaches and reaches an inverted position, thereby causing aeration of the fermentable material. The baffles 5, which have the form, as shown in Figures 3 and 4, being placed alternately between the buckets 4, serve to give the contents of the drum 3 a back and forth motion, thus causing further mixing of the fermentable material with the gas. The interior of the drum 3 may be observed through the sight glasses 6. The petcock 8 serves for removing samples of the solution and for emptying the drum 3 when the process is complete.

My invention comprises the introduction of gas, and of solutions or suspensions of carbohydrate material, or of any carbon source, suitable for use in biochemical processes, into a drum equipped either with vanes and buckets attached to the inside of the shell of the drum, or to arms attached to a central shaft and suitably mounted to provide motion to the drum or central shaft, or both.

My invention may be practiced by fastening to the inside shell of a drum or cylinder a series of spikes or projections, or the spikes may be placed through the shell from the outside, so as to break up the mass within the cylinder, thereby exposing it to the gas, or gas mixtures, which is injected into the drum or cylinder, through any suitable connections, during the operation of my process.

Furthermore, my invention may be practiced by the use of a drum or cylinder having a rotatable shaft therein, to which are attached arms adapted to support suitable vanes and buckets. By causing the shaft to rotate while the drum is stationary, aeration is obtained.

A preferred embodiment of my invention involves causing a drum or cylinder, containing the liquid to be fermented, to be rotated slowly, in contradistinction to high speed rotation, by any suitable means. The inner surface of the drum or cylinder that is used should have vanes and buckets attached to it in such a fashion as to cause the mixture inside the cylinder to rush to and fro lengthwise and also spill over the edges of the buckets, thereby thoroughly mixing the contents and exposing different portions of same to the gas, or gas mixtures, which is injected into the drum or cylinder under pressure, through any suitable connections, during the operation of the process.

I have found that the use of a cylindrical drum, as hereinbefore mentioned, gives better results in the practicing of my invention, but I do not wish, however, to limit myself to any particular shape of container.

Although the invention has been described with considerable particularity as to detail, it will, of course, be understood that it can be modified considerably to meet local conditions or requirements without departing from the spirit of my invention.

Having thus described my invention, what I claim for Letters Patent is:

1. A method for carrying out aeration in biochemical processes, which comprises introducing fermentable material into a container; subjecting said material to rotation; causing it to fall in substantially thin sheets, the while introducing a gas containing an appreciable quantity of oxygen; then causing the excess gases to escape from said container, and thereby making a continuous, intimate contact of the gas with the fermentable material.

2. A method for carrying out aeration in biochemical processes, which comprises introducing fermentable material into a container; subjecting said material to rotation; causing it to fall in substantially thin sheets; causing said material to flow back and forth in said container, the while introducing a gas containing an appreciable quantity of oxygen; then causing the excess gases to escape from said container, and thereby making a continuous, intimate contact of the gas with the fermentable material.

RUDOLPH HELLBACH.